United States Patent
Priyadarshi et al.

(10) Patent No.: US 7,260,563 B1
(45) Date of Patent: Aug. 21, 2007

(54) EFFICIENT COSTING FOR INCLUSION MERGE JOIN

(75) Inventors: Bibhu Ranjan Priyadarshi, El Segundo, CA (US); Grace Kwan-On Au, Rancho Palos Verdes, CA (US); Kuorong Chiang, Cerritos, CA (US)

(73) Assignee: NCR Corp., Dayton, OH (US)

( * ) Notice: Subject to any disclaimer, the term of this patent is extended or adjusted under 35 U.S.C. 154(b) by 521 days.

(21) Appl. No.: 10/681,869

(22) Filed: Oct. 8, 2003

(51) Int. Cl.
*G06F 17/30* (2006.01)
*G06F 17/00* (2006.01)

(52) U.S. Cl. .................. 707/2; 707/3; 707/1; 715/513
(58) Field of Classification Search ............ 707/1–10, 707/100–104.1, 200–205
See application file for complete search history.

(56) References Cited

U.S. PATENT DOCUMENTS

| | | | |
|---|---|---|---|
| 5,544,355 A * | 8/1996 | Chaudhuri et al. | 707/2 |
| 6,134,546 A * | 10/2000 | Bestgen et al. | 707/4 |
| 6,275,818 B1 * | 8/2001 | Subramanian et al. | 707/2 |
| 6,636,845 B2 * | 10/2003 | Chau et al. | 707/1 |
| 6,865,567 B1 * | 3/2005 | Oommen et al. | 707/2 |
| 2004/0117359 A1 * | 6/2004 | Snodgrass et al. | 707/3 |
| 2004/0225639 A1 * | 11/2004 | Jakobsson et al. | 707/2 |

* cited by examiner

*Primary Examiner*—Mohammad Ali
*Assistant Examiner*—Navneet K Ahluwalia
(74) *Attorney, Agent, or Firm*—Baker Botts LLP

(57) ABSTRACT

A method, database system, and computer program are disclosed for optimized costing. The method includes identifying a join that identifies a first table and a second table. The method further includes determining an optimized cost of reading the first table. If the number of unique first table values is greater than the number of unique second table values, the number of instances where a unique first table value matches a unique second table value is returned. Otherwise, the number of unique first table values is returned. The method further includes determining an optimized cost of reading the second table. The optimized cost of reading the second table includes the number of unique second table values. The method also includes summing the optimized cost of reading the first table and the optimized cost of reading the second table.

30 Claims, 11 Drawing Sheets

EFFICIENT COSTING FOR INCLUSION MERGE JOIN

TECHNICAL FIELD OF THE INVENTION

The present invention relates generally to relational database systems and more particularly, to efficient costing for inclusion merge join.

BACKGROUND

In relational databases using SQL, relationships are used to decompose tables into smaller structures. As a result, related information may be stored in multiple tables. It is not uncommon for normalized data models and their corresponding physical relational database systems to include joins. Joins allow the creation of rows in a virtual table that includes data selected from two different tables. SQL uses a JOIN operator to pull data from the two tables to create the virtual table. Typically, the two tables are referred to individually as the left table and the right table. However, the tables may also be referred to as outer and inner tables or left and right relations. These terms are generally considered to be symmantical equivalents. In some relational database systems, such as in the Teradata Active Data Warehousing System available from NCR Corporation, the assignee of the present invention, various costing routines may be used to choose the best plan of SQL execution. The costing routines may determine the cost of reading the rows of the left table and the cost of reading the rows of the right table. Generally, the costing routines may assume that the all rows from the left and right tables will be read.

SUMMARY

In general, in one aspect, the invention features a method of optimized costing. The method includes identifying a join that identifies a first table and a second table. The first table includes one or more unique first table values. The second table includes one or more unique second table values. The method further includes determining an optimized cost of reading the first table. If the number of unique first table values is greater than the number of unique second table values, the optimized cost of reading the first table includes returning the number of instances where a unique first table value matches a unique second table value. Otherwise, the optimized cost of reading the first table includes returning the number of unique first table values. The method further includes determining an optimized cost of reading the second table. The optimized cost of reading the second table includes the number of unique second table values. The method also includes summing the optimized cost of reading the first table and the optimized cost of reading the second table.

Implementations of the invention may include one or more of the following. The method may further include multiplying the optimized cost of reading the first table by a multiplier if the number of unique first table values is greater than the number of unique second table value. The multiplier may be the number of unique second table values divided by the number of unique first table values. The method may further include determining the optimized cost of reading the second table by performing unique sorting on the right table. The method may further include determining a maximum cost associated with the join, comparing the maximum cost associated with the join to the sum of the optimized cost of reading the first table and the optimized cost of reading the second table, and returning the maximum cost if the maximum cost is less than the sum of the optimized cost of reading the first table and the optimized cost of reading the second table. The maximum cost may include the sum of an unoptimized cost of reading the first table and an unoptimized cost of reading the second table. The method may further include determining an optimized cost of reading the first table by assigning a confidence level to the first table and assigning a confidence level to the second table.

In general, in another aspect, the invention features a method of optimized costing. The method includes identifying a join that identifies a first table and a second table. The first table includes one or more unique first table values. The second table includes one or more unique second table values. The method further includes removing one or more duplicate instances of each of the one or more unique second table values to determine an optimized cost of reading the second table. The method further includes exiting the join after each of the first unique table values is matched to a second unique table value to determine an optimized cost of reading the first table. The method also includes summing the optimized cost of reading the first table and the optimized cost of reading the second table.

Implementations of the invention may include one or more of the following. The method may further include determining whether the number of unique first table values is greater than the number of unique second table values. If the number of unique first table values is greater than the number of unique second table values, the method may include multiplying the optimized cost of reading the first table by a multiplier. Otherwise, the method may include returning the number of unique first table values. The multiplier may be the number of unique second table values divided by the number of unique first table values. The method may further include removing the one or more duplicate instances of each of the one or more unique second table values by performing unique sorting on the right table and by returning the number of unique second table values. The method may further include determining a maximum cost associated with the join, comparing the maximum cost associated with the join with the sum of the optimized cost of reading the first table and the optimized cost of reading the second table, and returning the maximum cost if the maximum cost is less than the sum of the optimized cost of reading the first table and the optimized cost of reading the second table. The maximum cost may include the sum of an unoptimized cost of reading the first table and an unoptimized cost of reading the second table. The method may further include exiting the join after each of the first unique table values is matched to a second unique table value by assigning a confidence level to the first table and assigning a confidence level to the second table.

In general, in another aspect, the invention features a database system including a massively parallel processing system including one or more nodes, a plurality of CPUs, each of the one or more nodes providing access to one or more CPUs, a plurality of data storage facilities each of the one or more CPUs providing access to one or more data storage facilities, and a table, the table being stored on one or more of the data storage facilities, the table including one or more rows. The database system includes an optimizer for optimizing costing. The optimizer includes a process for identifying a join that identifies a first table and a second table. The first table includes one or more unique first table values. The second table includes one or more unique second table values. The optimizer further includes a process for determining an optimized cost of reading the first table. If the number of unique first table values is greater than the number of unique second table values, the optimized cost of reading the first table includes returning the number of instances where a unique first table value matches a unique second table value. Otherwise, the optimized cost of reading the first table includes returning the number of unique first table values. The optimizer further includes a process for determining an optimized cost of reading the second table. The optimized cost of reading the second table includes the number of unique second table values. The optimizer further includes a process for summing the optimized cost of reading the first table and the optimized cost of reading the second table.

In general, in another aspect, the invention features a database system including a massively parallel processing system including one or more nodes, a plurality of CPUs, each of the one or more nodes providing access to one or more CPUs, a plurality of data storage facilities each of the one or more CPUs providing access to one or more data storage facilities, and a table, the table being stored on one or more of the data storage facilities, the table including one or more rows. The database system includes an optimizer for optimizing costing. The optimizer includes a process for identifying a join that identifies a first table and a second table. The first table includes one or more unique first table values. The second table includes one or more unique second table values. The optimizer further includes a process for removing one or more duplicate instances of each of the one or more unique second table values to determine an optimized cost of reading the second table. The optimizer further includes a process for exiting the join after each of the first unique table values is matched to a second unique table value to determine an optimized cost of reading the first table. The optimizer further includes a process for summing the optimized cost of reading the first table and the optimized cost of reading the second table.

In general, in another aspect, the invention features a computer program, stored on a tangible storage medium, for optimizing costing. The program includes executable instructions that cause a computer to identify a join that identifies a first table and a second table. The first table includes one or more unique first table values. The second table includes one or more unique second table values. The program also includes executable instructions that cause the computer to determine an optimized cost of reading the first table. If the number of unique first table values is greater than the number of unique second table values, the program includes executable instructions that cause the computer to return the number of instances where a unique first table value matches a unique second table value. Otherwise, the program includes executable instructions that cause the computer to return the number of unique first table values. The program also includes executable instructions that cause the computer to determine an optimized cost of reading the second table. The optimized cost of reading the second table includes the number of unique second table values. The program also includes executable instructions that cause the computer to sum the optimized cost of reading the first table and the optimized cost of reading the second table.

In general, in another aspect, the invention features a computer program, stored on a tangible storage medium, for optimizing costing. The program includes executable instructions that cause a computer to identify a join that identifies a first table and a second table. The first table includes one or more unique first table values. The second table includes one or more unique second table values. The program also includes executable instructions that cause the computer to remove one or more duplicate instances of each of the one or more unique second table values to determine an optimized cost of reading the second table. The program also includes executable instructions that cause the computer to exit the join after each of the first unique table values is matched to a second unique table value to determine an optimized cost of reading the first table. The program also includes executable instructions that cause the computer to sum the optimized cost of reading the first table and the optimized cost of reading the second table.

DETAILED DESCRIPTION

Costing optimization techniques operate by improving the calculations required to estimate the cost of reading the right and left tables of a join. For example, optimized costing may account only for the datablocks storing the unique values in the right table. Accordingly, all duplicate values found in the rows of the right table may be removed and not accounted for in the costing of the join. Additionally, optimized costing may determine whether the number of unique values in the left table is greater than the number of unique values in the right table. Where the number of unique values in the left table is greater, the join may be exited as soon as all the datablocks in the left table are probed for matching datablocks in the right table. Using these techniques, an optimized cost may be determined for performing a particular join between two tables. An example query for which this algorithm is applicable is: sel . . . from sales_info where item_id in (sel item_id from top_sales). Thus, the query specifies a semi-join, which can be implemented using a number of different physical join methods, e.g. inclusion merge join and inclusion product join. The optimized costing techniques allow for the efficient and accurate costing so that the more optimal join method may be selected. For purposes of this document, right and left tables may also be referred to as first and second tables, respectively, since the terms are semantically equivalent.

Figure 1:
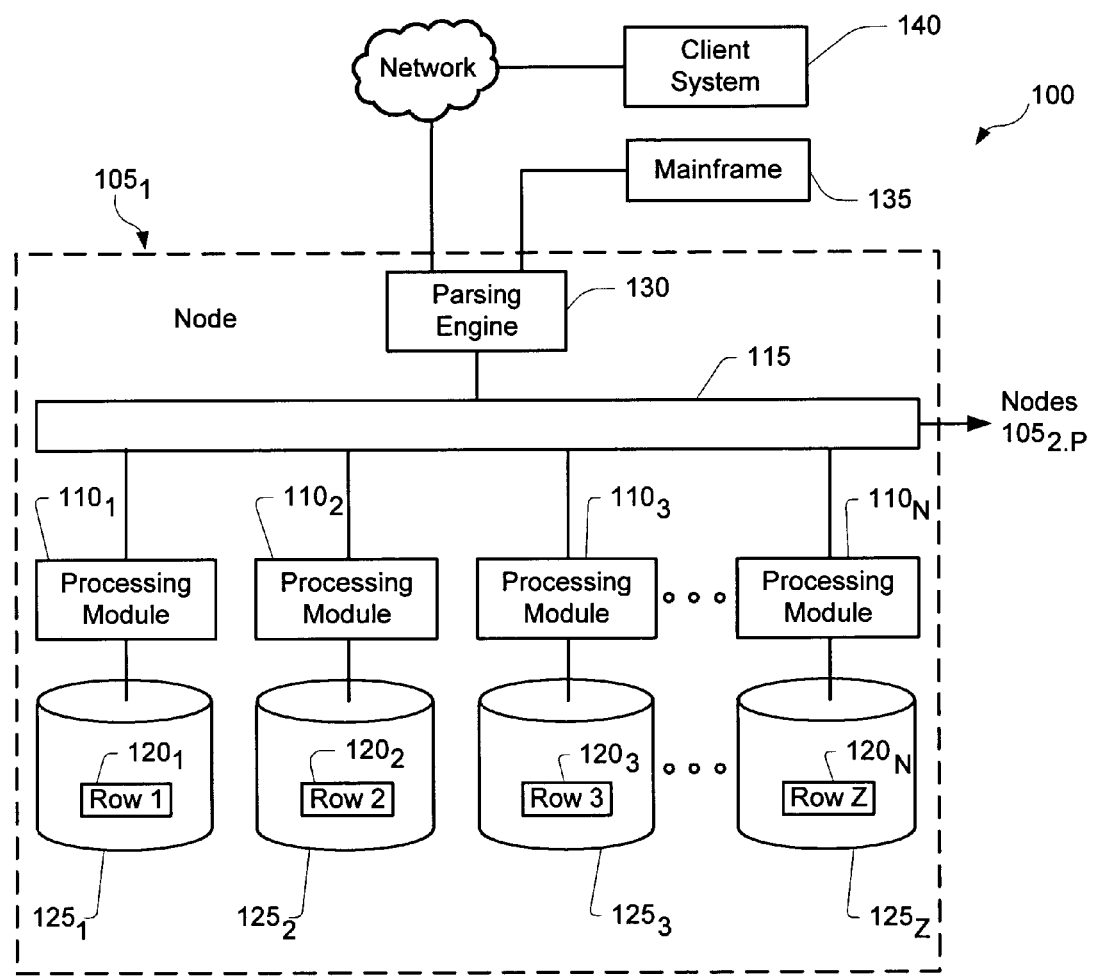
FIG. 1 is a block diagram of a node of a database system.

The costing optimization techniques disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The DBS may include multiple nodes $105_2 \ldots _P$ in addition to the illustrated node $105_1$, connected by extending the network 115.

The system stores data in one or more tables in the data-storage facilities $120_1 \ldots _N$. The rows $125_1 \ldots _Z$ of the tables are stored across multiple data-storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
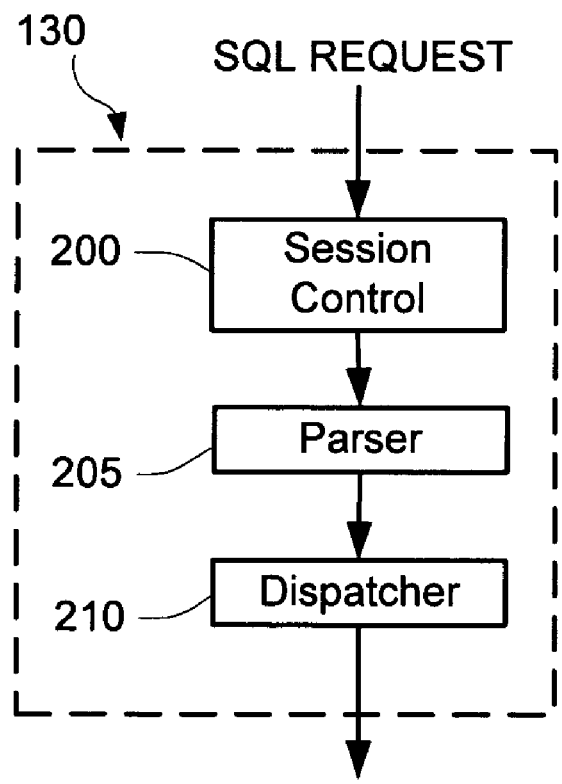
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
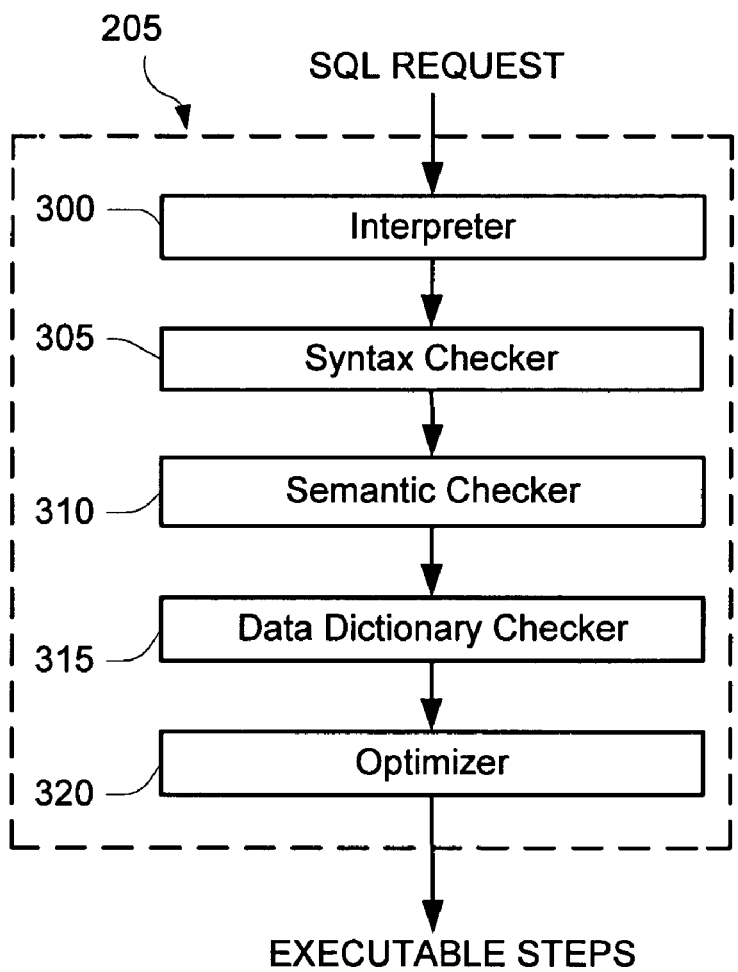
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
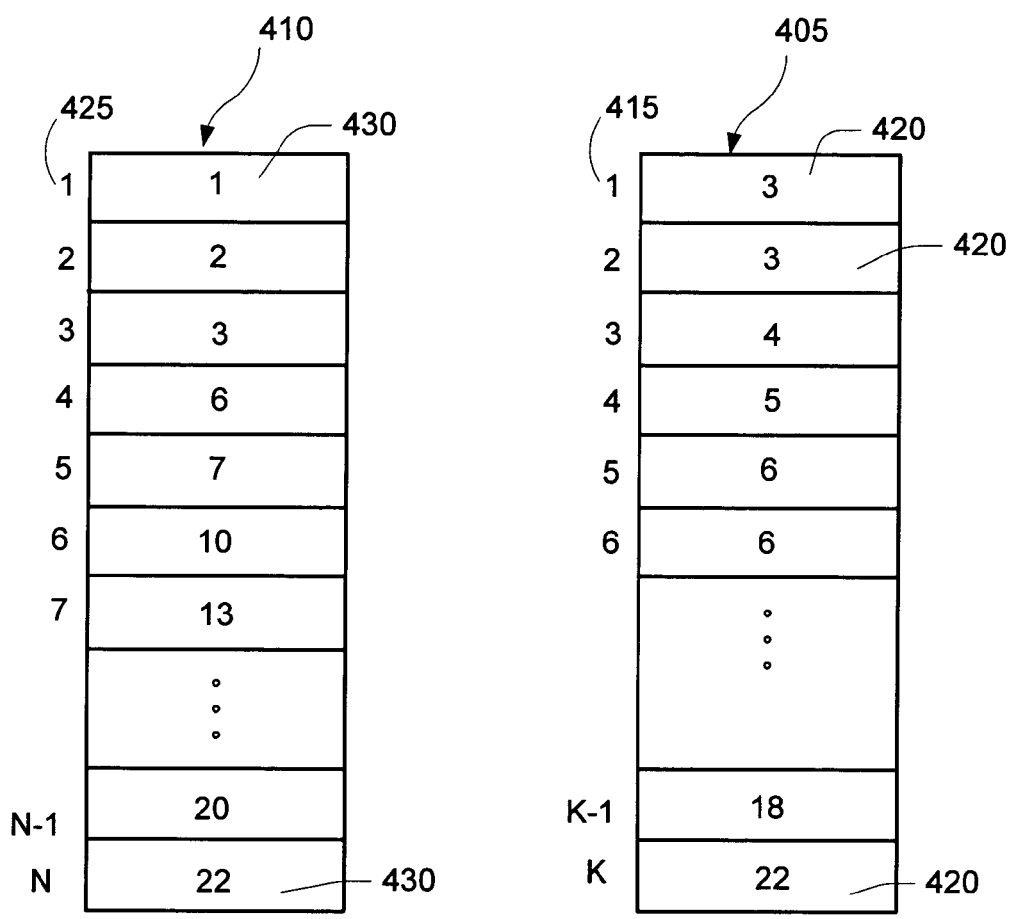
FIG. 4 is a representation of example right and left tables to be joined.

In some instances, optimizer 320 may determine the least expensive plan for performing a join request by performing a costing routine on the left and right tables to be joined. An example of a right table 405 and a left table 410 to be joined is illustrated in FIG. 4. Right table 405 includes rows, e.g. 415, associated with right datablocks 420. As can be seen in FIG. 4, right table 405 includes K rows associated with K datablocks. In some embodiments, multiple right datablocks 420 may include multiple instances of a particular value. For example, right table 405 includes multiple instances of the values 3 and 6 in right datablocks 420. Where right table 405 includes duplicates of a particular value, the number of unique values in right datablocks 420 is less than K. Left table 410 includes left rows, e.g. 425, associated with left datablocks 430. As illustrated in FIG. 4, left table 410 includes N rows that store N datablocks. Although it is contemplated that multiple left datablocks 430 may include multiple instances of a particular value, in the illustrated example, the number of unique values in left datablocks 430 is equal to N.

Figure 5A:
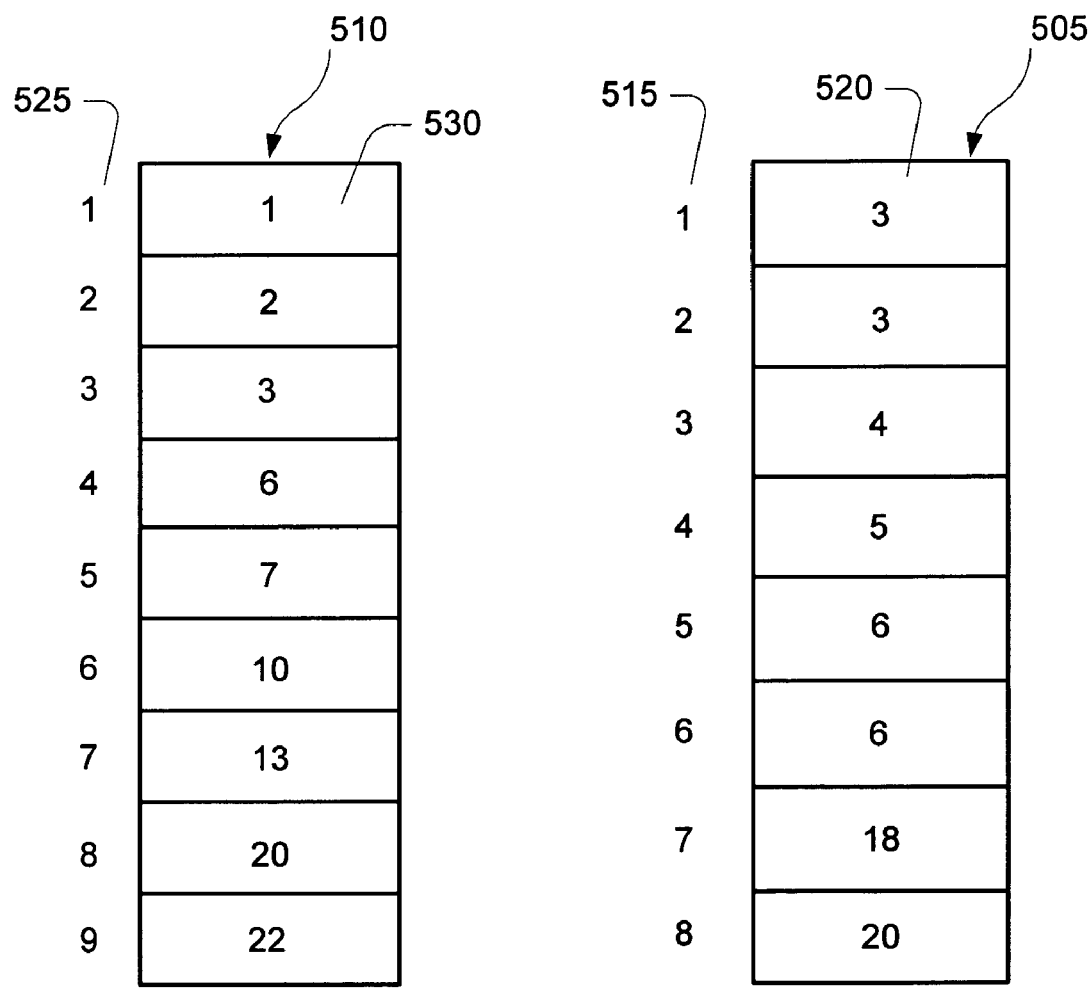
FIG. 5A is a representation of the example right and left tables as optimized costing of the left table is performed.
Figure 5B:
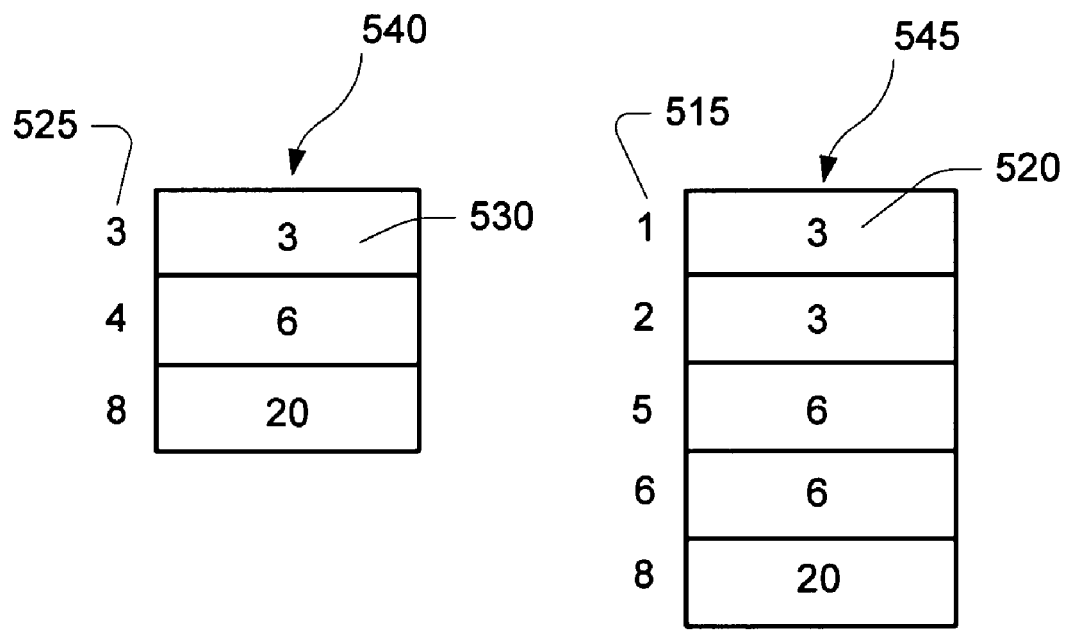
FIG. 5B is a representation of the example right and left tables as optimized costing of the right table is performed.

FIGS. 5A and 5B illustrate an example left table 510 and example right table 505 for which optimized costing may be performed. As illustrated, right table 505 includes eight right rows 515 associated with eight right datablocks 520. Of the eight right datablocks 520, six right datablocks 520 contain unique values. Specifically, rows 1, 3, 4, 5, 7, and 8 of example right table 505 include unique values 3, 4, 5, 6, 18, and 20, respectively. As also illustrated in FIG. 5A, example left table 510 includes nine left rows 525 associated with nine left datablocks 530. In this particular example, all nine left datablocks 520 contain unique values. Specifically, rows 1-9 of example left table 510 include unique values 1, 2, 3, 6, 7, 10, 13, 20, and 22, respectively. However, the number of right rows 515, left rows 525, unique values in right datablocks 520, unique values in left datablocks 530, and the particular values included in right datablocks 520 and left datablocks 530 are for example purposes only. The example system accommodates left and right tables 510 and 505 may include any number of rows and any number of unique values. In some examples, the right and left tables may be very large with many millions of rows and many millions of unique values. Because large tables would be difficult to manipulate for discussion purposes, the size and content of left table 510 and right table 505 has been arbitrarily selected.

Optimized costing of left table 510 may be performed using an adjusted left relation costing algorithm where all left rows 525 from left table 510 need not be read. The optimized costing of left table 510 may account for the fact that only those left rows 525 having a values matching values in right datablocks 520 are read. In this manner, left table 510 and right table 505 may be adjusted or reduced to only those values that are common to both left table 510 and right table 505. In the illustrated example, the values that are common to both left table 510 and right table 505 include 3, 6, and 20. Accordingly, rows 3, 4, and 8 of left table 510 have been read or pulled from left table 510 to result in adjusted left table 540. Similarly, rows 1, 2, 5, 6, and 8 of right table 505, which include values common to left table 510, have been read or pulled from right table 505 to result in adjusted right table 545. The optimized cost of reading left table 510 may then be determined as the cost of reading left rows 525 that include values that match one or more datablocks 520 of right table 505. In the particular example illustrated in FIGS. 5A and 5B, the cost of reading left rows 525 is the cost of reading three rows.

In particular example systems, the optimized costing of left table 510 may be adjusted based on a comparison of the number of unique values in right datablocks 520 to the number of unique values in left datablocks 530. For example, where the number of unique values in left datablocks 530 is greater than the number of unique values in right datablocks 520, the optimized cost of reading left table 510 may be adjusted by a multiplier based on this comparison. In particular example systems, the multiplier may include the number of unique values in right datablocks 520 divided by the number of unique values in left datablocks 530. In this manner, optimized cost of left table 510 may be further adjusted since only the fewer right rows 515 would be joined with left table 510. As such, the optimized cost of reading left table 510 is much less than the cost of reading all rows 525 of left table 510.

Further optimized costing algorithms may be used to determine an optimized cost of reading adjusted right table 545, or a merge cost. The merge cost may be defined as the cost of merging left table 510 with right table 505. More particularly, the merge cost is the optimized cost of reading adjusted right table 545 to produced the joined rows. The merge cost algorithm is used in lieu of reading all rows 515 of right table 505 or all rows 515 of adjusted right table 545. In particular, unique sorting may be performed on adjusted right table 545 to remove any duplicate instances of values in right datablocks 520. Since all right rows 515 from adjusted right table 545 need not be read, only those right rows 515 having a unique value associated with right rows 515 are read. Thus, the optimized cost of reading adjusted right table 545 is merely the cost of reading right rows 515 that include unique values. In the illustrated example, multiple instances of 3 and 6 appear in right datablocks 520. Specifically, rows 2 and 6 of adjusted right table 545 include duplicate instances of the values 3 and 6, respectively. Accordingly, in determining the optimized cost of reading adjusted right table 545, rows 2 and 6 of adjusted right table 545 may not be read. As such, the optimized cost of reading adjusted right table 545 is the cost of reading three rows, which is much less than the cost of reading all rows 525 of right table 505.

The optimized costs of reading adjusted left table 540 and adjusted right table 545, as described above, may then be used to determine the optimized join cost for a particular join request. The optimized join cost for a particular join request is the sum of the cost of reading the left table and the cost of reading the right table. In the illustrated example, the optimized join cost is the cost of reading six rows since the cost of reading adjusted left table 540 is the cost of reading three rows and the cost of reading adjusted right table 545 is the cost of reading three rows. After determining an optimized cost for a particular join request, the optimized join cost for a particular join request may be compared to the cost of performing other joins to determine the best plan of SQL execution. Optimizer 320 may select the join request with the lowest join cost.

Figure 6:
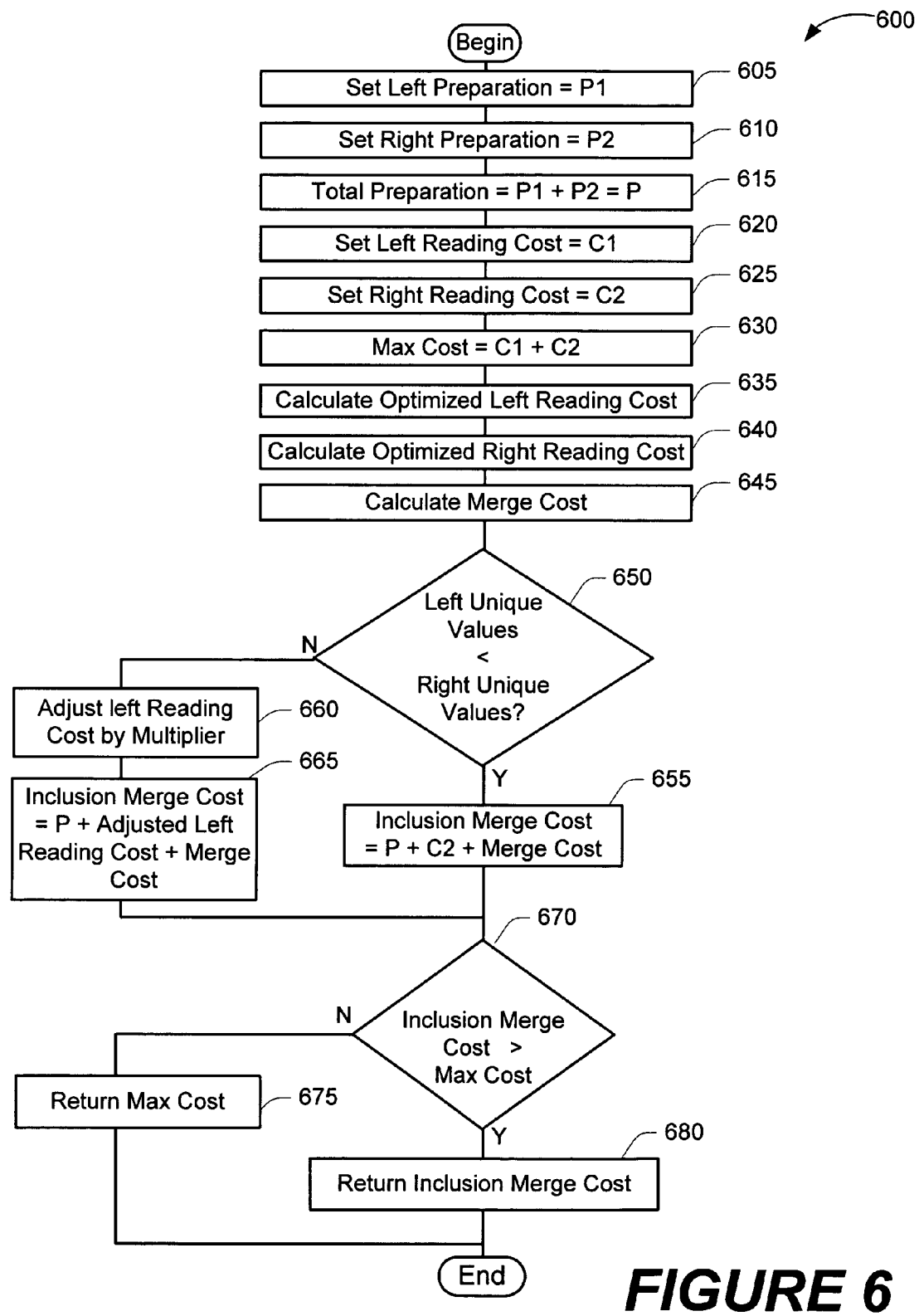
FIGS. 6-9 are flowcharts for a system for optimizing the costing of joins.
Figure 7:
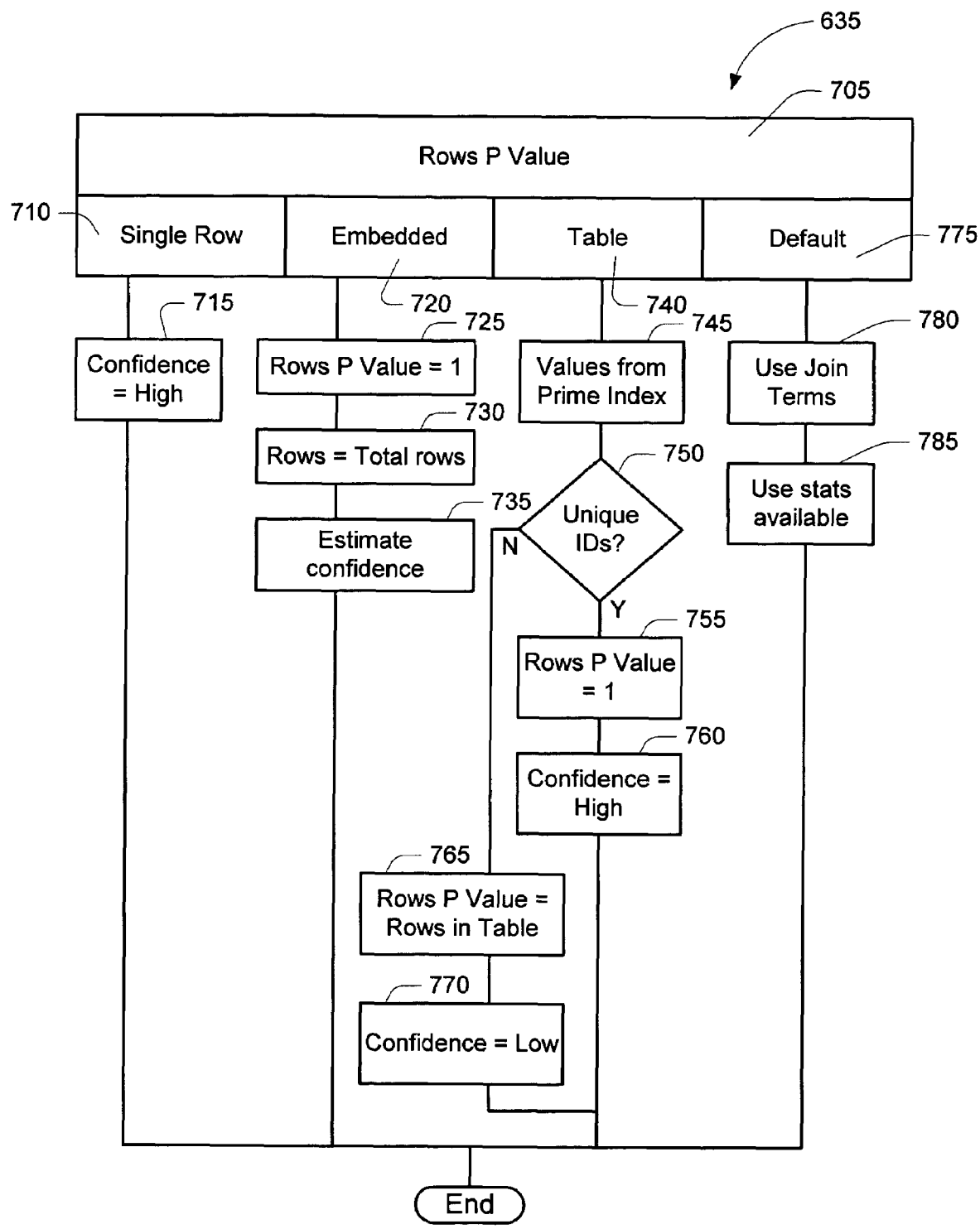
Figure 8A:
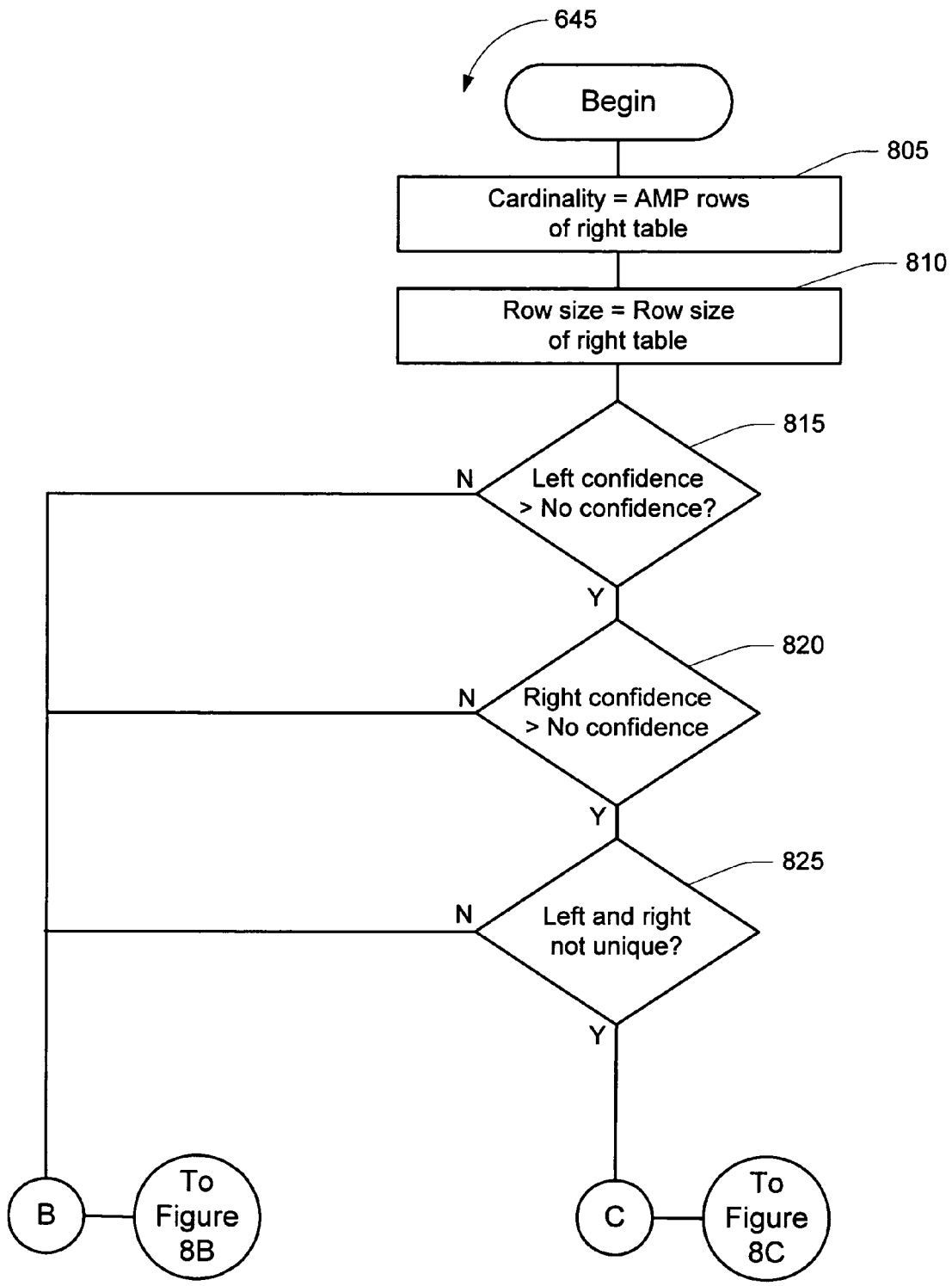
Figures 8B, 8C:
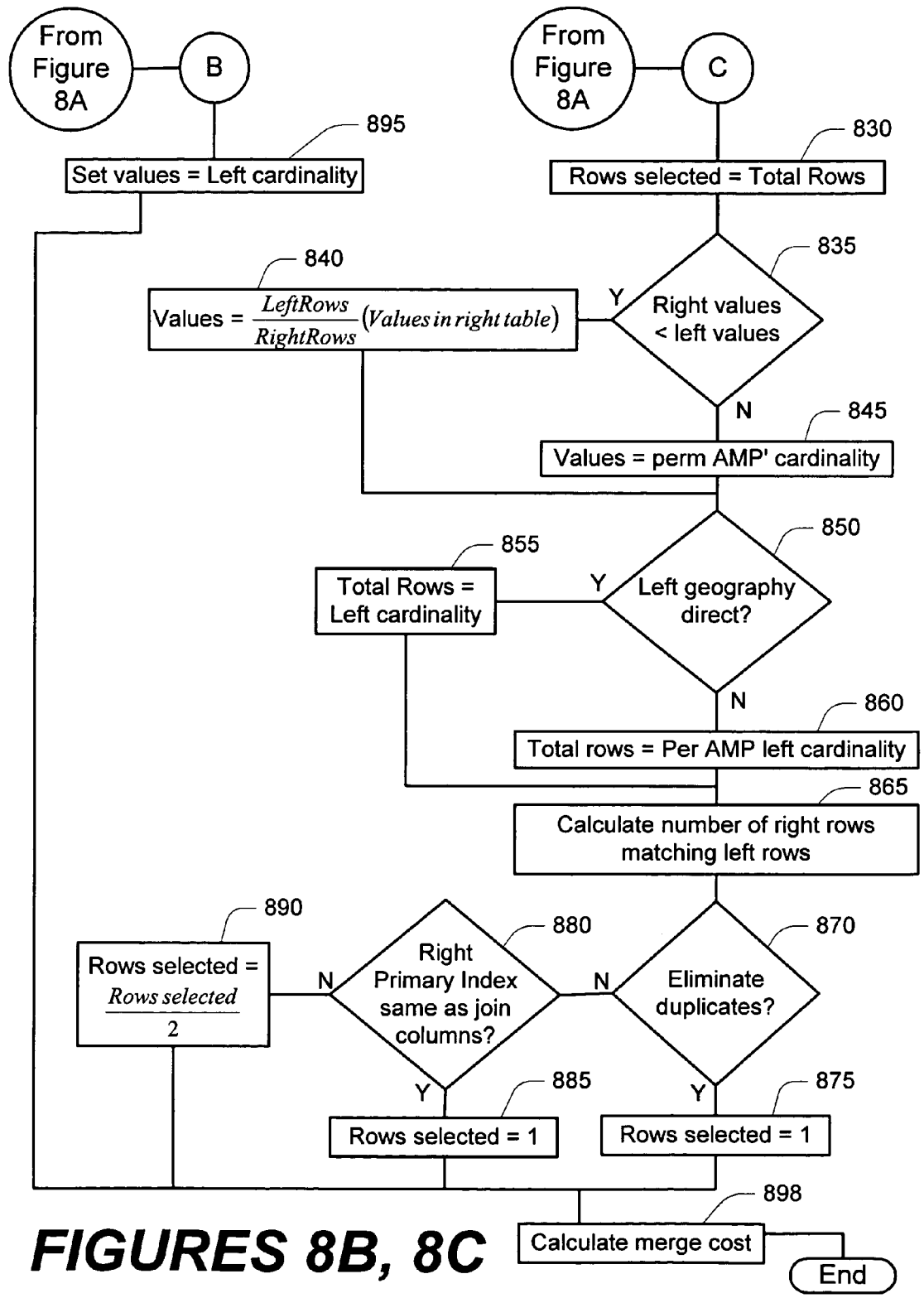
Figure 9:
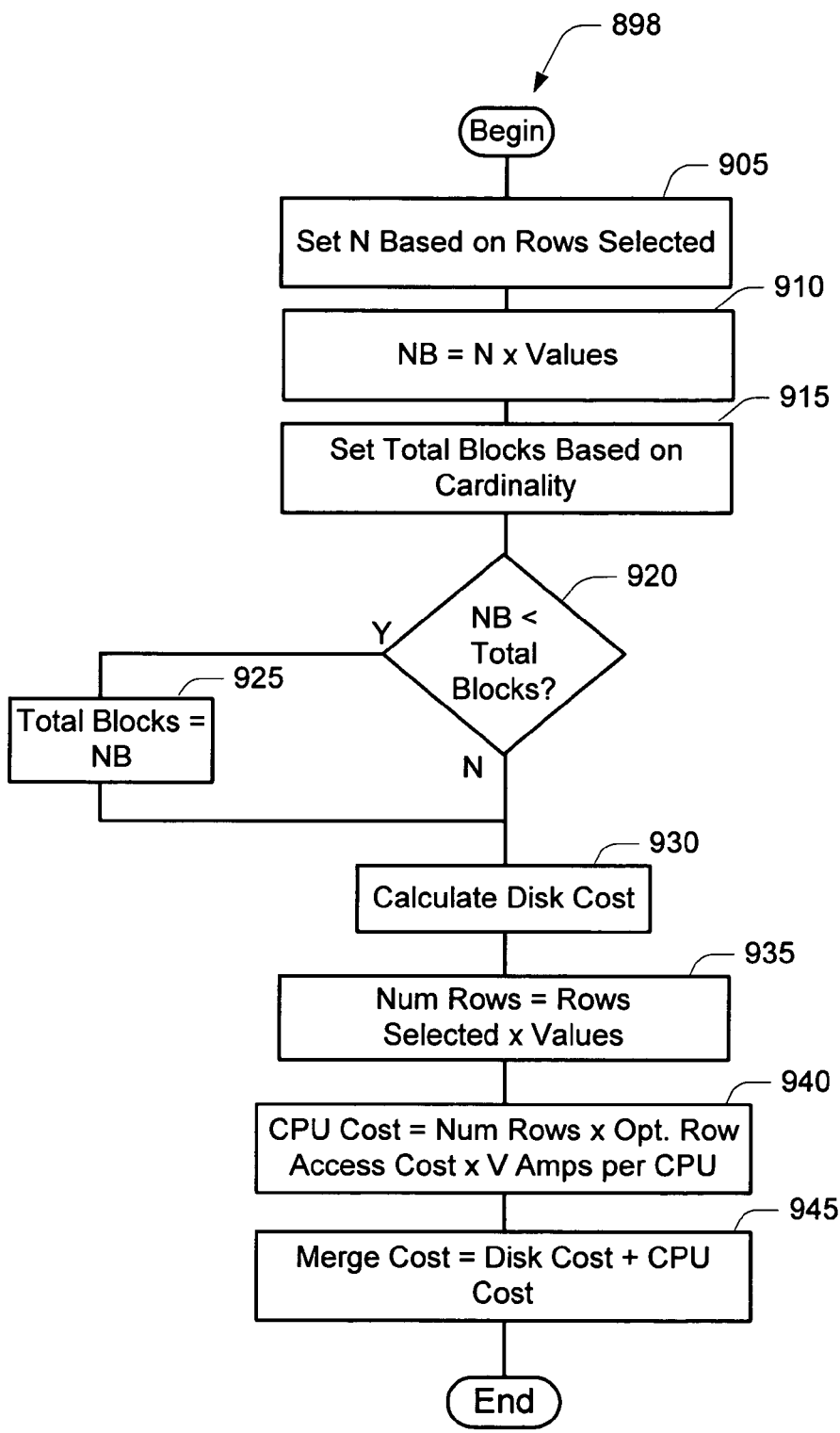

Below is an example algorithm for performing optimized join costing as might be used to calculate the optimized cost of joining example left table 410 and example right table 405. The driver function is Binary Join Cost (BJCST) and is illustrated in FIG. 6. BJCST 600 calculates the cost of joining any two relations or tables of any geography by any defined join types. The inputs to BJCST 600 are the preparation cost, the total read cost, geography of the two relations or tables, and any other appropriate parameter for determining optimized join costing. Only the enhanced logistics are shown below. The function calls other subroutines to formulate the demographics of the tables and calculate the components of the optimized cost of reading left table 410 and right table 405.

PROCEDURE BJCST( )
BEGIN

1. Find the cost of preparation of left table and set it as P1 (block 605);
2. Find the cost of preparation of right table and set it as P2 (block 610);
3. Set the total preparation cost as P=P1+P2 (block 615);
4. Find the cost of reading left table rows from disk and set it as C1 (block 620);
5. Find the cost of reading right table rows from disk and set it as C2 (block 625);
6. Consider the mode of reading of rows as NUPI (Non Unique Primary Index);
7. Add the costs of reading the left and right table and set that as the Max Cost of the inclusion join of the two tables (block 630);
8. Call RowsPerValue( ) function on the left table to find out the rows per value, uniqueness and other demographics (block 635);
9. Call RowsPerValue( ) function on the right table to find out the rows per value, uniqueness and other demographics (block 640);
10. Call OptStr( ) to find the Merge cost of the two tables (block 645);
11. If left unique values are less than right unique values (block 650)
    11.1 Calculate the Inclusion merge cost as sum of (P+C1+Merge cost) (block 655);
12. else
    12.1 Adjust the Left table reading cost by the multiplier (U2/U1) (block 660);
    12.2 Calculate the Inclusion merge cost as sum of (P+Adjusted Left reading cost+Merge cost) (block 665);
13. If by any chance the Inclusion merge cost becomes greater than the max cost (block 670)
    13.1 Set Inclusion merge cost as max cost (block 675);
14. Return the Inclusion merge cost (block 680); END BJCST 600 calls the RowsPValue 635 and 645 to formulate the demographics of the two relations or tables 510 and 505 and returns the value to BJCST 600.

FUNCTION RowsPValue(RowsPValue, Values, Confidence, Unique_flag, Relat, JFields, Geog)
BEGIN 1. RowsPValue=Relat→TotalRows (block 705);
2. If single Row Relation (block 710)
   2.1 Then set Confidence=OptHighConfidence (block 715);
3. If Table is an embedded relation (block 720)
   3.1 Set RowsPValue as one (block 725);
   3.2 Set Rows as total rows from the relation (block 730);
   3.3 Set confidence as confidence in estimate of the Relation (block 735);
4. If Table is a table relation and geography is direct (block 740)
   4.1 Set Values from the prime index descriptor of the table (block 745);
   4.2 If unique ids is present in the join term and table (block 750)
       4.2.1 Set RowsPValue as 1 (block 755);
       4.2.2 Set Confidence as high confidence (block 760);
   4.3 Else
       4.3.1 Set RowsPValue as Rows in table/Values (block 765);
       4.3.2 Set confidence as low confidence (block 770);

5. Else /*default */ (block 775)
   5.1 Use Join terms field to find a suitable index or possible multi column statistics on it (block 780);
   5.2 Use the stats available to determine RowsPValue, Confidence, Unique_flag, Values (block 785);
END Based on the demographics determined in RowsPValue 635 and 640, BJCST 600 calculates the adjusted left cost and calls Call_OptStr to set up the parameters for calculation of MergeCost 645 by the OptStr function.

FUNCTION Call_OptStr( )
BEGIN
1. Set Cardinality as perm AMP rows of right table (block 805);
2. Set Row size as row size of right table (block 810);
3. If Confidence of left table is greater than no confidence (block 815) and confidence of right table is greater than no confidence (block 820) and left and right tables are not unique (block 825)
   3.1 Set RowsSelected as total row of right table/values in right table (block 830);
   3.2 If right values<left values (block 835)
     3.2.1 Values=(Total rows from left table/values of left table) x values in right table (block 840);
   3.3 Else
     3.3.1 Set Values as perm AMP cardinality of left table (block 845);
   3.4 If left geog is direct (block 850)
     3.4.1 Set total rows as cardinality of left table (block 855);
   3.5 Else
     3.5.1 Set total rows as per AMP cardinality of left table (block 860);
   3.6/* Find the number of right rows joining with left rows */(block 865);
   3.7 If the join plan eliminates duplicate rows (block 870)
     3.7.1 Set RowsSelected=1 (block 875);
   3.8 Else
     3.8.1 If the right table's PI is the same as the join column(s) and there are no qualifying conditions on the right table (block 880)
       3.8.1.1 Set RowsSelected=1 (block 885);
     3.8.2 Else
       3.8.2.1 Set RowsSelected=RowsSelected/2/* average */ (block 890);
4. Else
   4.1 Set values=cardinality of left table (block 895);
5. Call OptStr based on the input values (block 898);
END Call_OptStr calls the Optstr function 898 to calculate the optimized cost of reading the right table, or Mergecost 645. The optimized cost of reading the right table is the sum of the CPU cost and the disk cost and is proportional to the number of rows to be read from the two tables.

FUNCTION OptStr( )
BEGIN
1. Set N as number of blocks based on rows selected (block 905);
2. Set NB as (N×Values) (block 910);
3. Set total blocks as number of blocks based on cardinality (block 915);
4. If NB<total blocks (block 920)
   4.1 then total blocks=NB (block 925);
5. Calculate disk cost for reading total blocks (block 930);
6. Set number of rows as (Rows Selected×Values) (block 935);
7. Set CPU cost as (NumRows×OptRowAccessCost×VAMPsPerCPU) (block 940);
8. Return Merge cost as (disk cost+CPU cost) (block 945);
END The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimized costing, the method comprising:
identifying a join that identifies a first table and a second table, the first table comprising one or more unique first table values, the second table comprising one or more unique second table values;
determining an optimized cost of reading the first table, the optimized cost of reading the first table comprising:
if the number of unique first table values is greater than the number of unique second table values,
returning the number of instances where a unique first table value matches a unique second table value;
otherwise,
returning the number of unique first table values;
determining an optimized cost of reading the second table, the optimized cost of reading the second table comprising the number of unique second table values;
summing the optimized cost of reading the first table and the optimized cost of reading the second table;
determining a maximum cost associated with the join, the maximum cost comprising the sum of an unoptimized cost of reading the first table and an unoptimized cost of reading the second table;
comparing the maximum cost associated with the join to the sum of the optimized cost of reading the first table and the optimized cost of reading the second table; and
returning the maximum cost if the maximum cost is less than the sum of the optimized cost of reading the first table and the optimized cost of reading the second table.

2. The method of claim 1, further comprising multiplying the optimized cost of reading the first table by a multiplier if the number of unique first table values is greater than the number of unique second table values.

3. The method of claim 2, wherein the multiplier is the number of unique second table values divided by the number of unique first table values.

4. The method of claim 1, wherein determining the optimized cost of reading the second table further comprises performing unique sorting on the right table.

5. The method of claim 1, wherein determining an optimized cost of reading the first table further comprises:
assigning a confidence level to the first table; and
assigning a confidence level to the second table.

6. A method of optimized costing, the method comprising:
identifying a join that identifies a first table and a second table, the first table comprising one or more unique first table values, the second table comprising one or more unique second table values;
removing one or more duplicate instances of each of the one or more unique second table values to determine an optimized cost of reading the second table;

exiting the join after each of the first unique table values is matched to a second unique table value to determine an optimized cost of reading the first table;

summing the optimized cost of reading the first table and the optimized cost of reading the second table;

determining a maximum cost associated with the join, the maximum cost comprising the sum of an unoptimized cost of reading the first table and an unoptimized cost of reading the second table;

comparing the maximum cost associated with the join with the sum of the optimized cost of reading the first table and the optimized cost of reading the second table; and returning the maximum cost if the maximum cost is less than the sum of the optimized cost of reading the first table and the optimized cost of reading the second table.

7. The method of claim 6, further comprising:

determining whether the number of unique first table values is greater than the number of unique second table values;

if the number of unique first table values is greater than the number of unique second table values,
multiplying the optimized cost of reading the first table by a multiplier;

otherwise,
returning the number of unique first table values.

8. The method of claim 7, wherein the multiplier is the number of unique second table values divided by the number of unique first table values.

9. The method of claim 6, wherein removing the one or more duplicate instances of each of the one or more unique second table values comprises:

performing unique sorting on the right table; and
returning the number of unique second table values.

10. The method of claim 6, wherein exiting the join after each of the first unique table values is matched to a second unique table value further comprises:

assigning a confidence level to the first table; and
assigning a confidence level to the second table.

11. A database system for accessing a database, the database system including:

a massively parallel processing system including
one or more nodes;
a plurality of CPUs, each of the one or more nodes providing access to one or more CPUs;
a plurality of virtual processes each of the one or more CPUs providing access to one or more processes; and
each process configured to manage data stored in one of a plurality of data-storage facilities;

an optimizer for optimizing costing, the optimizer including:
a process for identifying a join that identifies a first table and a second table, the first table comprising one or more unique first table values, the second table comprising one or more unique second table values;
a process for determining an optimized cost of reading the first table, the optimized cost of reading the first table comprising:
if the number of unique first table values is greater than the number of unique second table values,
a process for returning the number of instances where a unique first table value matches a unique second table value;
otherwise,
a process for returning the number of unique first table values;
a process for determining an optimized cost of reading the second table, the optimized cost of reading the second table comprising the number of unique second table values;
a process for summing the optimized cost of reading the first table and the optimized cost of reading the second table;
a process for determining a maximum cost associated with the join the maximum cost comprising the sum of an unoptimized cost of reading the first table and an unoptimized cost of reading the second table;
a process for comparing the maximum cost associated with the join to the sum of the optimized cost of reading the first table and the optimized cost of reading the second table; and
a process for returning the maximum cost if the maximum cost is less than the sum of the optimized cost of reading the first table and the optimized cost of reading the second table.

12. The database system of claim 11, wherein the optimizer further includes a process for multiplying the optimized cost of reading the first table by a multiplier if the number of unique first table values is greater than the number of unique second table values.

13. The database system of claim 12, wherein the multiplier is the number of unique second table values divided by the number of unique first table values.

14. The database system of claim 11, wherein the process for determining the optimized cost of reading the second table further comprises a process for performing unique sorting on the right table.

15. The database system of claim 11, wherein the process for determining an optimized cost of reading the first table further comprises:

assigning a confidence level to the first table; and
assigning a confidence level to the second table.

16. A database system for accessing a database, the database system including:

a massively parallel processing system including
one or more nodes;
a plurality of CPUs, each of the one or more nodes providing access to one or more CPUs;
a plurality of virtual processes each of the one or more CPUs providing access to one or more processes; and
each process configured to manage data stored in one of a plurality of data-storage facilities;

an optimizer for optimizing costing, the optimizer including:
a process for identifying a join that identifies a first table and a second table, the first table comprising one or more unique first table values, the second table comprising one or more unique second table values;
a process for removing one or more duplicate instances of each of the one or more unique second table values to determine an optimized cost of reading the second table;
a process for exiting the join after each of the first unique table values is matched to a second unique table value to determine an optimized cost of reading the first table;
a process for summing the optimized cost of reading the first table and the optimized cost of reading the second table;

a process for determining a maximum cost associated with the join, the maximum cost comprising the sum of an unoptimized cost of reading the first table and an unoptimized cost of reading the second table;

a process for comparing the maximum cost associated with the join with the sum of the optimized cost of reading the first table and the optimized cost of reading the second table; and a process for returning the maximum cost if the maximum cost is less than the sum of the optimized cost of reading the first table and the optimized cost of reading the second table.

17. The database system of claim 16, wherein the optimizer further includes:

a process for determining whether the number of unique first table values is greater than the number of unique second table values;

if the number of unique first table values is greater than the number of unique second table values,
  a process for multiplying the optimized cost of reading the first table by a multiplier;
otherwise,
  a process for returning the number of unique first table values.

18. The database system of claim 17, wherein the multiplier is the number of unique second table values divided by the number of unique first table values.

19. The database system of claim 16, wherein the process for removing the one or more duplicate instances of each of the one or more unique second table values comprises:
  performing unique sorting on the right table; and
  returning the number of unique second table values.

20. The database system of claim 16, wherein the process for exiting the join after each of the first unique table values is matched to a second unique table value further comprises:
  assigning a confidence level to the first table; and
  assigning a confidence level to the second table.

21. A computer program, stored on a tangible storage medium, for optimizing costing, the program including executable instructions that cause a computer to:
  identify a join that identifies a first table and a second table, the first table comprising one or more unique first table values, the second table comprising one or more unique second table values;
  determine an optimized cost of reading the first table, the optimized cost of reading the first table comprising:
    if the number of unique first table values is greater than the number of unique second table values,
      returning the number of instances where a unique first table value matches a unique second table value;
    otherwise,
      returning the number of unique first table values;
  determine an optimized cost of reading the second table, the optimized cost of reading the second table comprising the number of unique second table values;
  sum the optimized cost of reading the first table and the optimized cost of reading the second table;
  determine a maximum cost associated with the join, the maximum cost comprising the sum of an unoptimized cost of reading the first table and an unoptimized cost of reading the second table;
  compare the maximum cost associated with the join to the sum of the optimized cost of reading the first table and the optimized cost of reading the second table; and
  return the maximum cost if the maximum cost is less than the sum of the optimized cost of reading the first table and the optimized cost of reading the second table.

22. The computer program of claim 21 including executable instructions that further cause a computer to multiply the optimized cost of reading the first table by a multiplier if the number of unique first table values is greater than the number of unique second table values.

23. The computer program of claim 22, wherein the multiplier is the number of unique second table values divided by the number of unique first table values.

24. The computer program of claim 21, where when determining the optimized cost of reading the second table, the computer:
  performs unique sorting on the right table.

25. The computer program of claim 21, where when determining an optimized cost of reading the first table, the computer:
  assigns a confidence level to the first table; and
  assigns a confidence level to the second table.

26. A computer program, stored on a tangible storage medium, for optimizing costing, the program including executable instructions that cause a computer to:
  identify a join that identifies a first table and a second table, the first table comprising one or more unique first table values, the second table comprising one or more unique second table values;
  remove one or more duplicate instances of each of the one or more unique second table values to determine an optimized cost of reading the second table;
  exit the join after each of the first unique table values is matched to a second unique table value to determine an optimized cost of reading the first table; and
  sum the optimized cost of reading the first table and the optimized cost of reading the second table;
  determine a maximum cost associated with the join, the maximum cost comprising the sum of an unoptimized cost of reading the first table and an unoptimized cost of reading the second table;
  compare the maximum cost associated with the join with the sum of the optimized cost of reading the first table and the optimized cost of reading the second table; and
  return the maximum cost if the maximum cost is less than the sum of the optimized cost of reading the first table and the optimized cost of reading the second table.

27. The computer program of claim 26, including executable instructions that further cause a computer to:
  determine whether the number of unique first table values is greater than the number of unique second table values;
  if the number of unique first table values is greater than the number of unique second table values,
    multiply the optimized cost of reading the first table by a multiplier;
  otherwise,
    return the number of unique first table values.

28. The computer program of claim 27, wherein the multiplier is the number of unique second table values divided by the number of unique first table values.

29. The computer program of claim 26, where when removing the one or more duplicate instances of each of the one or more unique second table values, the computer:
  performs unique sorting on the right table; and
  returns the number of unique second table values.

30. The computer program of claim 26, where when exiting the join after each of the first unique table values is matched to a second unique table value, the computer:
  assigns a confidence level to the first table; and
  assigns a confidence level to the second table.

* * * * *